US005493711A

United States Patent [19]

Koyama

[11] Patent Number: 5,493,711

[45] Date of Patent: Feb. 20, 1996

[54] RADIO RECEIVER FOR LOCATING THE STRONGEST SIGNAL CARRYING A SELECTED PROGRAM

[75] Inventor: Kazuo Koyama, Ageo, Japan

[73] Assignee: Clarion Co., Ltd., Tokyo, Japan

[21] Appl. No.: 152,840

[22] Filed: Nov. 15, 1993

[30] Foreign Application Priority Data

Nov. 13, 1992 [JP] Japan .................................... 4-328733

[51] Int. Cl.[6] ........................................ H04B 1/10

[52] U.S. Cl. .................................... 455/194.1; 455/181.1; 455/212; 455/220; 455/223; 375/351

[58] Field of Search ............................. 455/45, 134–136, 455/161.3, 166.2, 171.1, 174.1, 181.1, 184.1, 186.1, 194.1, 200.1, 212–213, 220, 221, 223; 375/104; 381/104

[56] References Cited

U.S. PATENT DOCUMENTS

| | | | |
|---|---|---|---|
| 3,939,431 | 2/1976 | Cohlman | 455/221 |
| 4,400,585 | 8/1983 | Kamen et al. . | |
| 4,414,687 | 11/1983 | Hirata | 455/194.1 |
| 4,525,867 | 6/1985 | Shiratani | 455/194.1 |
| 4,573,210 | 2/1986 | Heck | 455/166.2 |
| 4,989,263 | 1/1991 | Suzuki | 455/184.1 |
| 5,151,922 | 9/1992 | Weiss | 375/104 |
| 5,220,682 | 6/1993 | Tomohiro | 455/184.1 |
| 5,222,254 | 6/1993 | Verron et al. | 455/166.2 |
| 5,349,699 | 9/1994 | Erben | 455/186.1 |

FOREIGN PATENT DOCUMENTS

| | | | |
|---|---|---|---|
| 0497115 | 1/1992 | European Pat. Off. . | |
| 0507096 | 5/1992 | European Pat. Off. . | |
| 4039117 | 12/1990 | Germany . | |
| 0023233 | 1/1987 | Japan | 455/212 |
| 1151318 | 6/1989 | Japan . | |
| 0148922 | 6/1991 | Japan | 455/222 |
| 0212029 | 9/1991 | Japan | 455/184.1 |
| 3284022 | 12/1991 | Japan | 455/194.1 |

*Primary Examiner*—Edward F. Urban
*Assistant Examiner*—Andrew Faile
*Attorney, Agent, or Firm*—Koda and Androlia

[57] ABSTRACT

A receiver has a random counter, which outputs a timer signal to a control circuit. A zero-cross point detection circuit generates a detection signal which is input to the control circuit. When the random counter outputs a timer signal and the zero-cross detection circuit detects a zero-cross point, a muting function is activated. Simultaneously, different frequencies are scanned for broadcasts containing the same program and having higher field strengths. If on re-checking zero-cross point detection, a zero-cross point is found or a predetermined interval has expired, then the muting function is deactivated. The frequency with the greater field strength is selected.

15 Claims, 5 Drawing Sheets

RADIO RECEIVER FOR LOCATING THE STRONGEST SIGNAL CARRYING A SELECTED PROGRAM

BACKGROUND OF THE INVENTION

The present invention relates to receivers. Specifically, the present invention relates to receivers which can locate the strongest signal carrying a selected type of program.

The Radio Data System (hereinafter referred to as RDS) broadcasting system is implemented in Europe. RDS broadcast transmissions incorporate an encoded list of frequencies, called an AF list, that carry the same programming. RDS receivers can automatically track frequencies carrying the same broadcast, using the AF list. Thus, when RDS receivers are used in mobile receivers, such as car radios, the same station can be received continuously without having to re-tune the receiver while driving.

Prior art receivers which have this capability come in two forms. One type uses two tuners. The first tuner receives an audio signal on one frequency, while the other tuner receives another frequency on the AF list corresponding to the frequency to which the first tuner is tuned. The signal-to-noise ratios (field strengths) of the two signals are measured, and the receiver automatically switches to the frequency with the greatest signal-to-noise ratio.

The other type of prior art receiver uses one tuner. It receives an audio signal and at certain intervals carries out a muting function. During the muting interval, a signal at a different frequency from the AF list is received. The signal-to-noise ratio of the new frequency signal is measured and compared to a present frequency signal. As above, the receiver will switch to the frequency of the signal with the highest signal-to-noise ratio.

In the one-tuner receivers, the timing of the muting intervals may be based on preset intervals. Alternatively, the muting interval can be performed when no audio signal is detected (silent time) or when the received signal-to-noise ratio of the signal received drops below a predetermined level.

Each of the prior art methods has distinct disadvantages. The preset interval method subjects the listener to periodic muting of the audio signal and noise generated by the switching system. This has an unpleasant and unnatural affect on the user. The silent-time method does not have the problem of muting, but silent times can be very rare during broadcasts containing background music, thus delaying the automatic tracking function. In the last method, a stronger station may not be selected because no tracking occurs only when the field strength drops below the predetermined level. Although the two-tuner receivers, noted above, avoid the drawbacks of the one-tuner units, they are more complex and have higher production costs.

OBJECTS AND SUMMARY OF THE INVENTION

It is accordingly an object of the present invention to overcome the drawbacks of the prior art.

It is a further object of the present invention to provide an improved method for determining when a stronger signal should be tracked.

It is a still further object of the present invention to provide a receiver which avoids the unpleasant muting and noise generation of one-tuner receivers which perform automatic tracking.

Briefly stated, the present invention provides a receiver having a random counter, which outputs a timer signal to a control circuit. A zero-cross point detection circuit generates a detection signal which is input to the control circuit. When the random counter outputs a timer signal and the zero-cross point detection circuit detects a zero-cross point, a muting function is activated. Simultaneously, different frequencies are scanned for broadcasts containing the same program and having higher field strengths. If on re-checking zero-cross point detection, a zero-cross point is found or a predetermined interval has expired, then the muting function is deactivated. The frequency with the greater field strength is selected.

According to an embodiment of the present invention, a receiver comprises: means for receiving an audio broadcast signal on a first frequency, means for converting the broadcast signal into an audio signal, means for timing random intervals, including means for generating a first signal upon completion of a one of a plurality of random intervals, means for detecting a zero-cross point of the audio signal including means for generating a second signal upon a crossing of the zero-cross point, means for muting a portion of the audio signal below the zero-cross point, means for controlling including means for activating the means for muting, the means for activating responsive to a simultaneous occurrence of the first signal and the second signal, means for receiving at least one different frequency when the muting means is active, means for controlling including means for deactivating the muting, and means for comparing field strength of the first frequency signal with the at least one different frequency signal.

According to still another embodiment of the present invention, a radio system comprises: a FM receiver, the FM receiver being of a type to produce an audio signal from a first frequency, means for timing random intervals, the means for timing generating a first signal upon completion of a one of a plurality of random intervals, means for detecting a zero-cross point of the audio signal, the means for detecting generating a second signal upon a crossing of the zero-cross point, means for muting a portion of the audio signal below the zero-cross point, a controller, the controller including means for activating the means for muting, the means for activating responsive to a simultaneous occurrence of the first signal and the second signal, the FM receiver receiving at least one different frequency signal when the muting means is active, and the controller including means for comparing field strength of the first frequency signal with the at least one different frequency signal.

According to still another embodiment of the invention, a method for tuning a receiver comprises: receiving an audio broadcast signal on a first frequency, converting the broadcast signal into an audio signal, generating random timing intervals, producing a first signal upon completion of a one of a plurality of random intervals, detecting a zero-cross point of the audio signal, producing a second signal upon a crossing of the zero-cross point, muting a portion of the audio signal below the zero-cross point in response to a simultaneous occurrence of the first signal and the second signal, receiving at least one different frequency when the muting occurs, deactivating the muting in response to a third signal, and comparing field strength of the first frequency signal with the at least one different frequency signal.

According to still another embodiment of the present invention, a receiver, comprises: means for receiving a broadcast signal, means for converting the broadcast signal into an audio signal, timer means for detecting the passage of random intervals of time after a reset of the timer means, means for muting the audio signal when the audio signal falls below a specified level after a random interval of time, means for receiving at least another broadcast signal when the audio signal is muted, means for comparing a field strength of the first broadcast signal and a field strength of the second broadcast signal.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
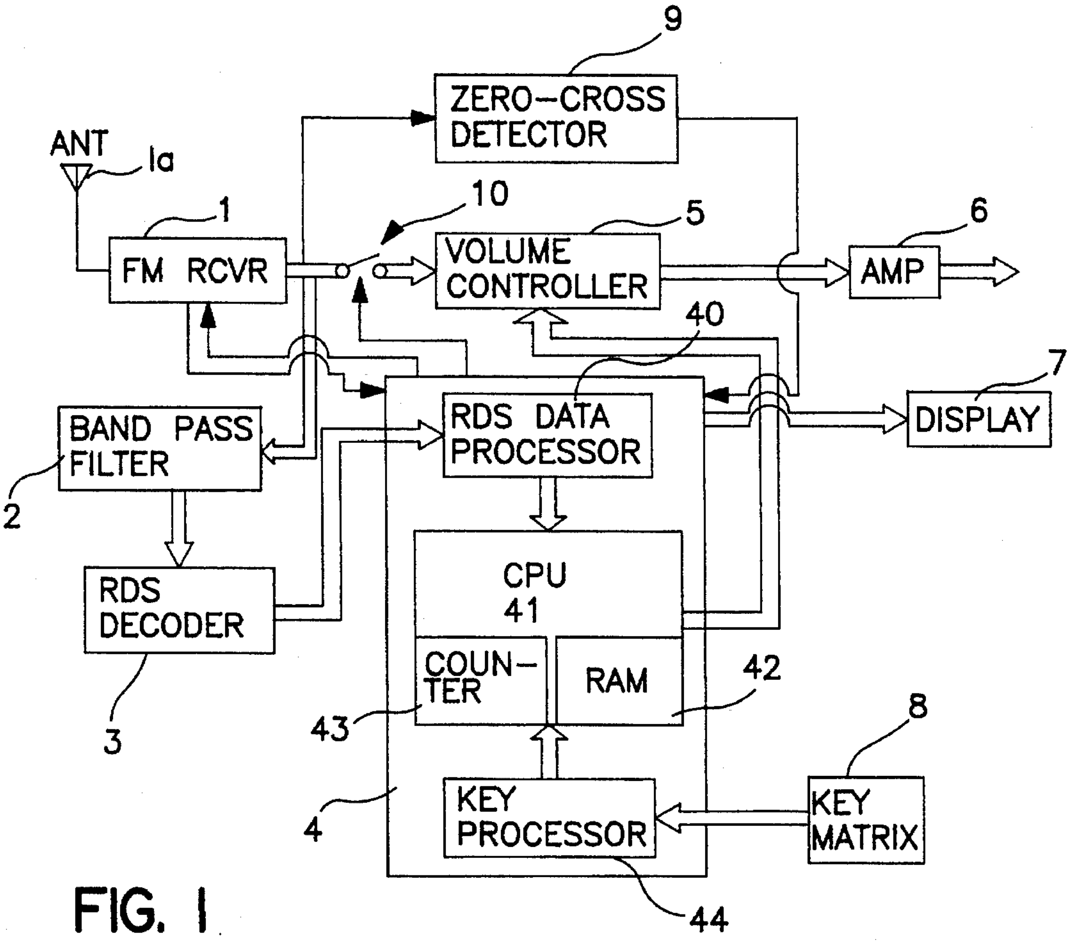
FIG. 1 is a block diagram of an embodiment of the present invention.

Referring to FIG. 1, a frequency modulation (FM) receiver 1 connected to an antenna la reproduces an audio frequency (AF) signal incorporated into a broadcast transmission signal. A microprocessor-based controller 4 controls the tuning of FM receiver 1 and the volume of a demodulated AF signal. The demodulated AF signal is volume controlled by an electronic volume controller 5. The volume controlled AF signal is applied to an amplifier 6. An amplified output from amplifier 6 is applied to a speaker (not shown).

The AF signal from FM receiver 1 also contains a RDS signal. The RDS signal is band-pass filtered in a band-pass filter circuit 2 to select the portion of the AF signal containing the RDS content and to remove unwanted frequencies, such as audible frequencies containing program material. An output of band-pass filter circuit 2 is applied to an RDS signal decoder/error correction circuit 3 which decodes and outputs the digital RDS data for application to controller 4. Controller 4 controls the tuning of FM receiver 1 and the volume of the demodulated AF signal produced by electronic volume controller 5.

Controller 4 contains an RDS data processing circuit 40, a central processing unit (CPU) 41, a random access memory (RAM) 42, a random counter 43 and a key processing circuit 44. Controller 4 sends suitable display data to a display unit 7. For example, display data may be a band, a frequency, RDS data, a signal strength or a time. A key matrix 8 is used by an operator to input instructions (key data) to key matrix 8, which supplies the key data to controller 4. For example, key matrix 8 can be incorporated in a front panel of the RDS receiver to permit user control of the operations of the RDS receiver. In response to the key data from key matrix 8, controller 4 can apply a tuning control signal to FM receiver 1, change the volume control data applied to electronic volume controller 5, or change the display data shown by display unit 7.

A zero-cross point detection circuit 9 is connected to FM receiver 1. Zero-cross point detection circuit 9 detects a zero-cross point of the demodulated AF signal output from FM receiver 1 and applies it to an input of controller 4. When a zero-cross point is detected, controller 4 closes a mute switch 10, thereby enabling the muting function.

Figure 2:
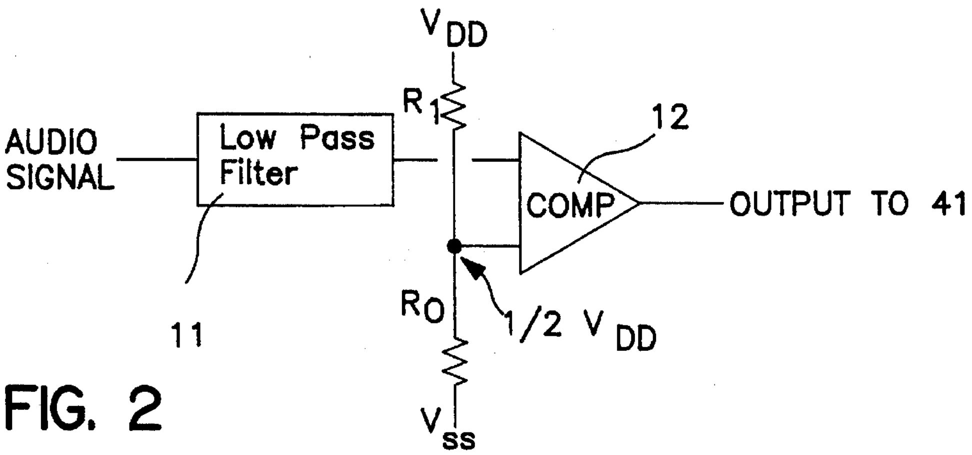
FIG. 2 is a circuit diagram showing a zero-cross detection circuit for the embodiment of FIG. 1.

Referring to FIG. 2, an embodiment of the zero-cross point detection circuit 9 is shown. An audio signal from FM receiver 1 is low-pass filtered by a low-pass filter 11 to eliminate high-frequency elements from the signal. The output from low-pass filter 11 is applied to a comparator 12.

Figure 3:
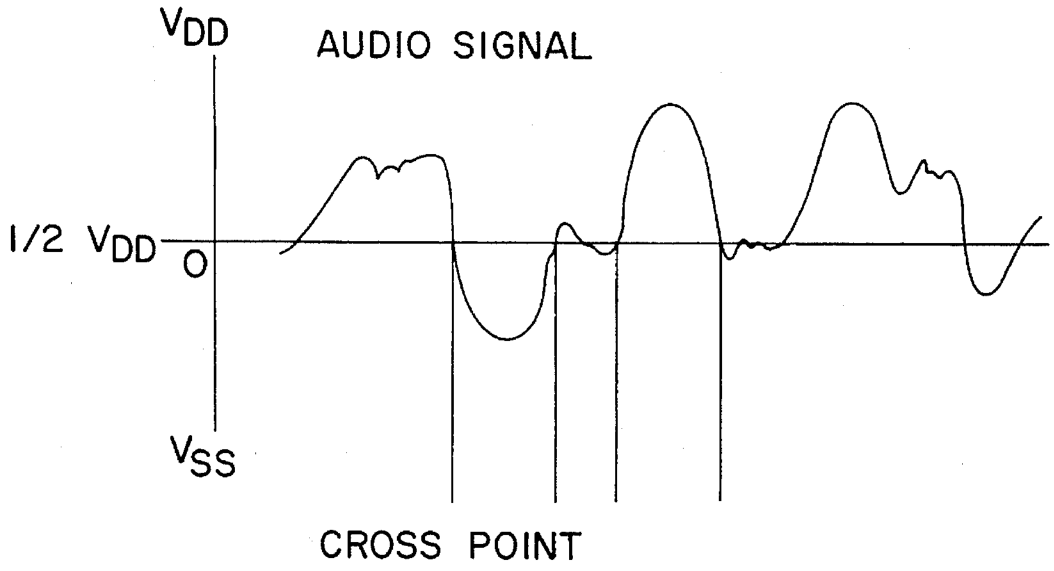
FIG. 3 is a drawing illustrating the zero-cross detection points of the embodiment of FIG. 2.

Referring to FIG. 3, zero-cross point detection circuit 9 compares the low-pass filtered output from low-pass filter 11 to a reference voltage of one-half a specified voltage $V_{dd}$. Whenever the low-pass filtered output passes through the reference voltage, comparator 12 outputs a signal to controller 4.

Figure 5:
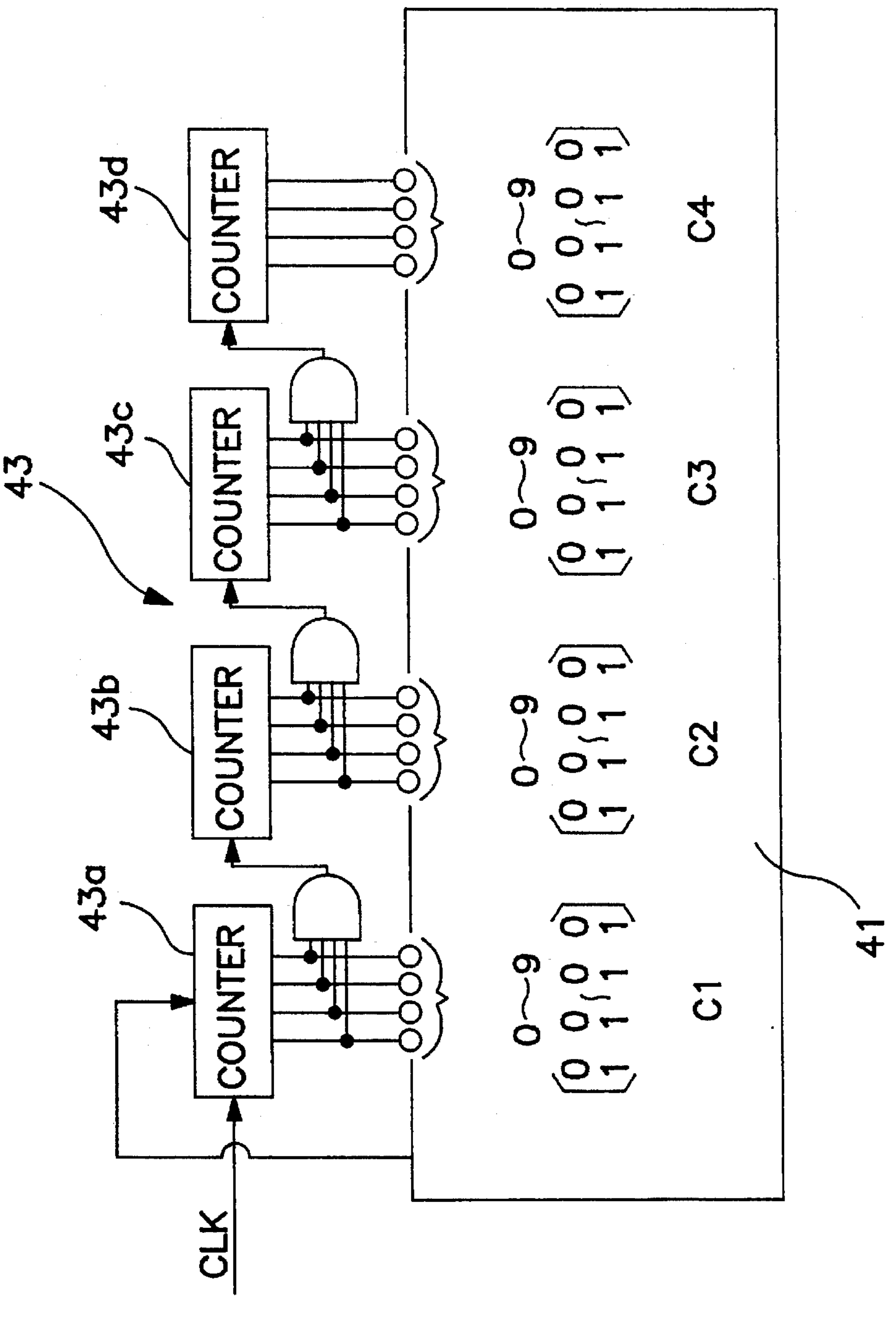
FIG. 5 is a block diagram showing a random counter for the embodiment of FIG. 1.

Referring to FIG. 5, in one embodiment of the present invention, controller 4 includes random counter 43, which includes four base-10 counters 43*a*, 43*b*, 43*c* and 43*d*. Each of these counters counts from zero to nine. The counter output is applied to CPU 41. These count values are referred to in FIG. 5 as count values C1, C2, C3 and C4.

Figure 6:
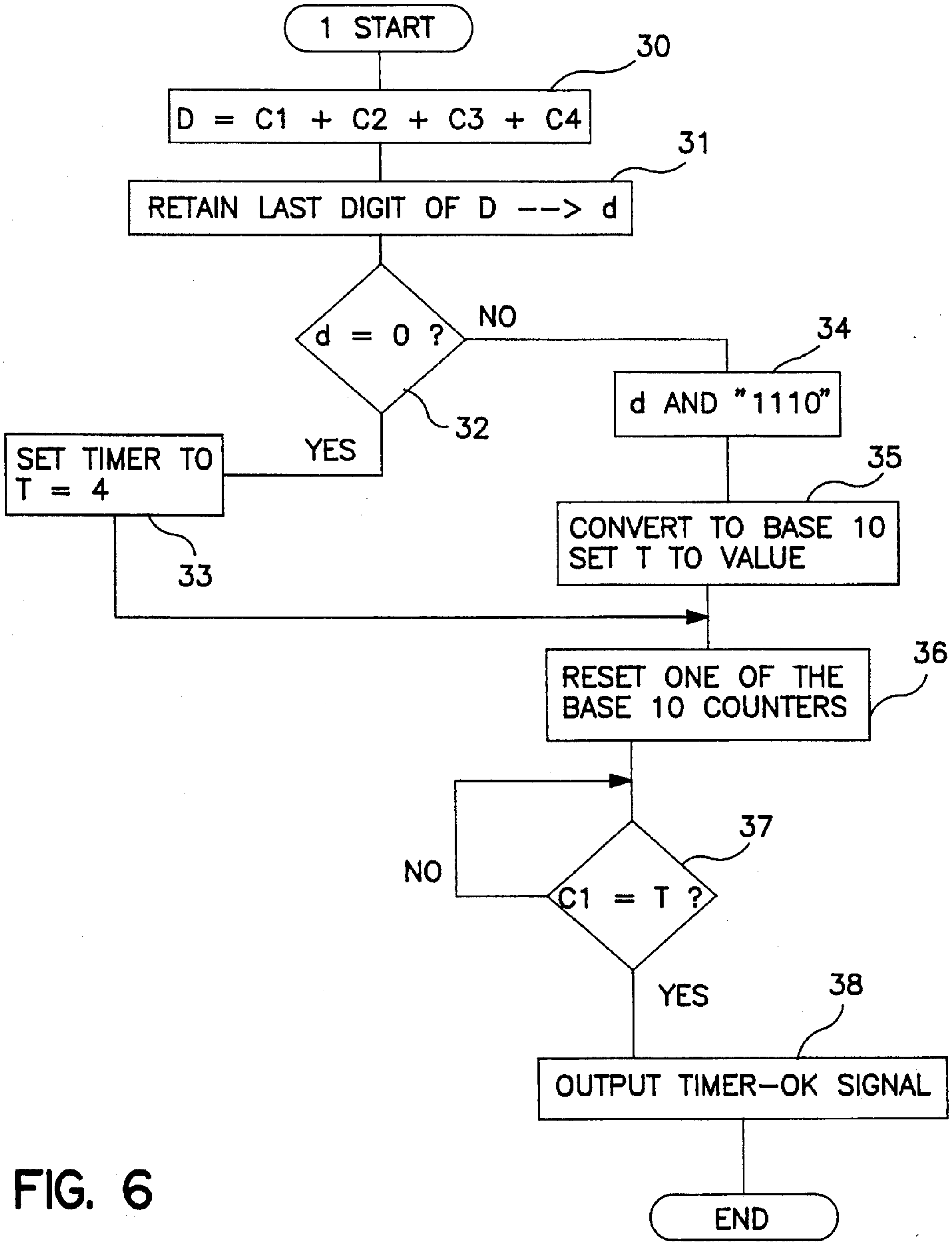
FIG. 6 is a flow chart of the operation of the random counter for the embodiment of FIG. 5.

Referring to FIG. 6, CPU 41 calculates a sum D of count values C1 through C4 in step 30. In step 31, only the last digit, the "units" digit d of the sum D is retained. If the value of the units digit d is zero in step 32, a timer value T is set to four in step 33. If the units digit d is non-zero, control passes to step 34. In step 34, a boolean AND operation is performed on the last digit d with the number "1110". The AND operation converts any odd value of units digit d to an even number. Thus, resultant values of two, four, six and eight are obtained. In step 35 the resultant value is converted to base 10 and is used as the timer value T.

Timer value T represents an interval of time in seconds. In step 36 CPU 41 outputs a reset signal, clearing one of the base 10 counters C1. In step 37, the reset base 10 counter counts time until the count is equal to timer value T. When the two values are equal, a timer-OK signal is output in step 38.

Figure 4A:
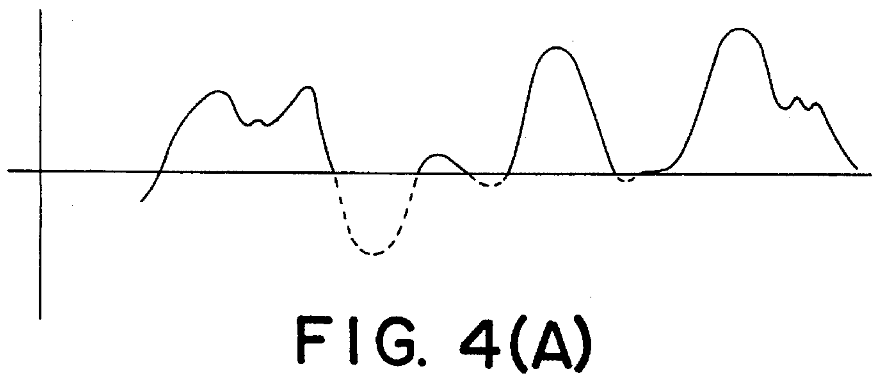
FIG. 4(A) is a drawing illustrating the resulting waveform for the embodiment of FIG. 2.
Figure 4B:
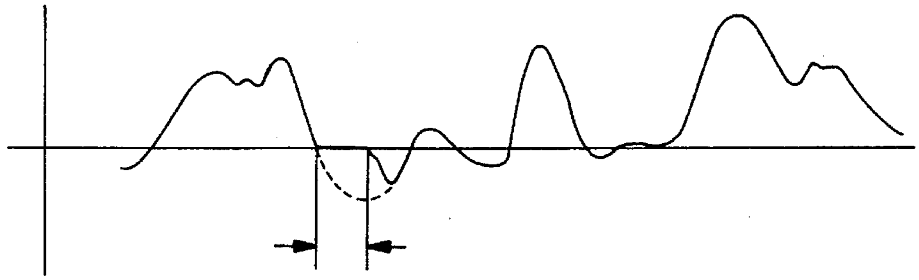
FIG. 4(B) is a drawing illustrating the resulting waveform for the embodiment of FIG. 2.

Returning to FIG. 1, FM receiver 1 is arranged so that when random counter 43 outputs a timer-OK signal and zero-cross point detection circuit 9 detects a zero-cross point, mute switch 10 is closed. This results in an audio signal waveform as shown in FIG. 4(A). The waveforms shown as dotted lines are eliminated. Simultaneously, another broadcast is received from the AF list and the signal-to-noise ratios of the frequencies are compared. Then, the frequency of the signal with the greatest signal-to-noise ratio is stored and the zero-cross point detection re-checked. The mute function can also be forced off when no zero-cross point is detected within a pre-set period of time. This is done because a long mute period generates undesirable sounds. The resulting waveform is illustrated in FIG. 4(*b*). This eliminates noise generated from detuning.

Figure 7:
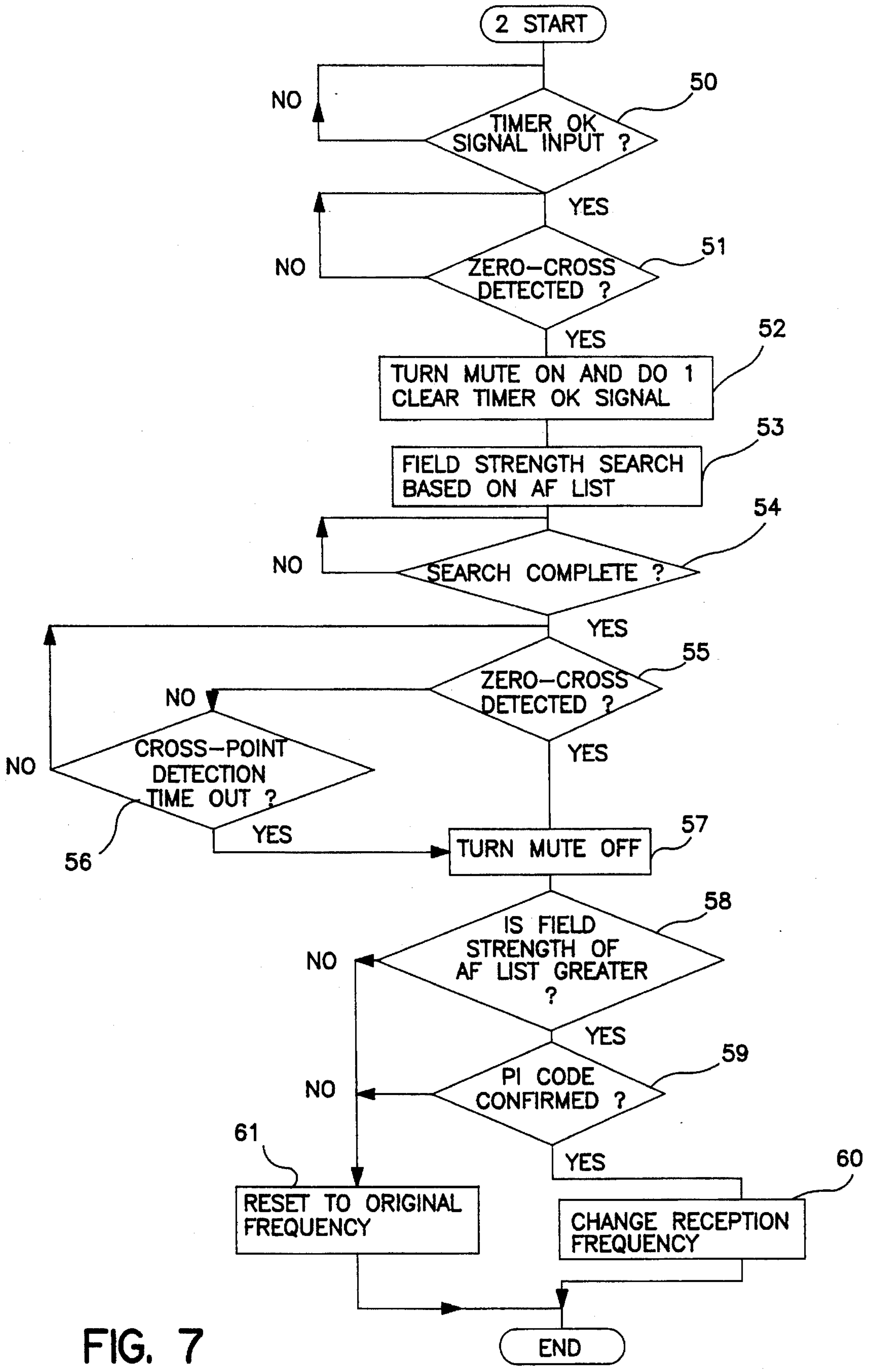
FIG. 7 is a top level flowchart of the operation of the embodiment of FIG. 6.

Referring now also to FIG. 7, in steps 50 and 51, controller 4 checks for a timer OK signal from random counter 43 and for a zero-cross detection signal from zero-cross point detection circuit 9. If there are signals from random counter 43 and zero-cross point detection circuit 9, mute switch 10 is switched on in step 52. Simultaneously, in step 53, a search is conducted to find the transmission in the AF list with the highest signal-to-noise ratio. When the end of the search is confirmed in step 54, control passes to step 55. Control branches from step 55 to step 57 if a zero-cross point is detected or to step 56 if no zero-cross point is detected. In step 57 the mute function is turned off. Step 56 branches to step 57 if a specified time interval has elapsed. If the specified time interval has not elapsed, control proceeds back to step 55. In step 57, the mute function is turned off. If the AF listed station has a greater signal-to-noise ratio in step 58 and if the Program Identification (PI) code is confirmed in step 59, the reception frequency is changed in step 60. If both conditions are not met, the original frequency is reset.

According to the embodiment described above, the mute function is potentiated at random intervals of time. Muting is initiated after the random interval when the audio signal falls below a specified level. During the muting interval, signal-to-noise ratio comparisons are performed. This minimizes interruptions and allows for pleasurable listening. Furthermore, since the turning on and off of the mute function takes place during zero-cross detection, noise generated from detuning is eliminated, and the interruptions in sound are minimized by reverberation.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A receiver, comprising:

means for receiving a first broadcast signal;

means for converting said broadcast signal into an audio signal;

means for timing random intervals, including means for generating a first signal upon completion of a one of a plurality of said random intervals;

means for detecting a zero-cross point of said audio signal including means for generating a second signal upon a detection of said zero-cross point;

means for muting a portion of said audio signal falling below a level coinciding with said zero-cross point;

means for controlling including means for activating said means for muting;

said means for activating being responsive to a simultaneous occurrence of said first signal and said second signal;

wherein said means for receiving receives at least one different broadcast signal when said means for muting is active;

said means for controlling further including means for deactivating said muting; and means for selecting for output the stronger one of said first broadcast signal and said at least one different broadcast signal.

2. A receiver according to claim 1, wherein said at least one different broadcast signal has a frequency in a predefined list of frequencies.

3. A receiver according to claim 1, wherein:

said means for selecting includes means for sensing a program identification code encoded in said first broadcast signal and said at least one different broadcast signal; and said means selecting includes means restricting selection to broadcast signals having encoded in them program identification codes equal to a predetermined program identification code.

4. A receiver according to claim 1, wherein said means for deactivating said muting includes means responsive to a timer set to a predetermined interval.

5. A receiver according to claim 1, wherein said means for deactivating said muting includes means responsive to a third signal generated by said means for detecting, upon a detection of another zero-cross point.

6. A radio system comprising:

a FM receiver;

said FM receiver for producing an audio signal from a first frequency signal;

means for timing random intervals;

said means for timing generating a first signal upon completion of a one of a plurality of said random intervals;

means for detecting a zero-cross point of said audio signal;

said means for detecting generating a second signal upon detection of said zero-cross point;

means for muting a portion of said audio signal falling below a level coinciding with said zero-cross point;

a controller;

said controller including means for activating said means for muting;

said means for activating responsive to a simultaneous occurrence of said first signal and said second signal;

said FM receiver receiving at least one different frequency signal when said muting means is active; and said controller including means for comparing field strengths of said first frequency signal with said at least one different frequency signal.

7. A radio system according to claim 6, wherein:

said controller further includes means for sensing a desired program identification code in said first frequency signal; and said controller including means for scanning an FM frequency band and, when a signal strength of said first frequency signal is greater than said at least one different frequency signal and said desired program identification code are both present, of taking an action in response thereto.

8. A radio system according to claim 7, wherein said action in response is to set a reception frequency to the frequency of the stronger of said first frequency signal and said at least one different frequency signal.

9. A method for tuning a receiver, comprising:

receiving an audio broadcast signal on a first frequency;

converting said broadcast signal into an audio signal;

generating random timing intervals;

producing a first signal upon completion of a one of a plurality of said random timing intervals;

detecting a zero-cross point of said audio signal;

producing a second signal upon a crossing of said zero-cross point;

muting a portion of said audio signal below said zero-cross point in response to a simultaneous occurrence of said first signal and said second signal;

receiving at least one different frequency signal when said muting occurs;

deactivating said muting in response to a third signal; and comparing the field strength of said first frequency signal with the field strength of said at least one different frequency signal.

10. A method for tuning a receiver according to claim 9, wherein said third signal is generated when a predetermined time interval is completed or when another zero-cross point is detected.

11. A receiver, comprising:

means for receiving a broadcast signal;

means for converting said broadcast signal into an audio signal;

timer means for detecting the passage of random intervals of time after a reset of said timer means;

means for muting said audio signal when said audio signal falls below a specified level after a random interval of time detected by said timer means;

wherein said means for receiving receives at least another broadcast signal when said audio signal is muted;

means for outputting the stronger of said broadcast signal and said at least another broadcast signal.

12. A receiver according to claim 11, wherein said at least another broadcast signal is transmitted at a frequency selected from a predetermined list of frequencies.

13. A receiver according to claim 11, further comprising:

means for sensing predetermined program identification codes incorporated in said broadcast signal and said at least another broadcast signal;

means for checking for identity of said predetermined program identification codes; and means for selecting for output one of said broadcast and at least another broadcast signals having a higher field strength.

14. A receiver according to claim 11, wherein said means for muting terminates a muting of said audio signal after a specified interval of time.

15. A receiver according to claim 11, wherein said means for muting terminates a muting of said audio signal when said audio signal rises above said specified level.

* * * * *